Nov. 4, 1941.   E. R. SCHROEDER ET AL   2,261,603
ADJUSTABLE MINE CAR BEARING
Filed April 9, 1940
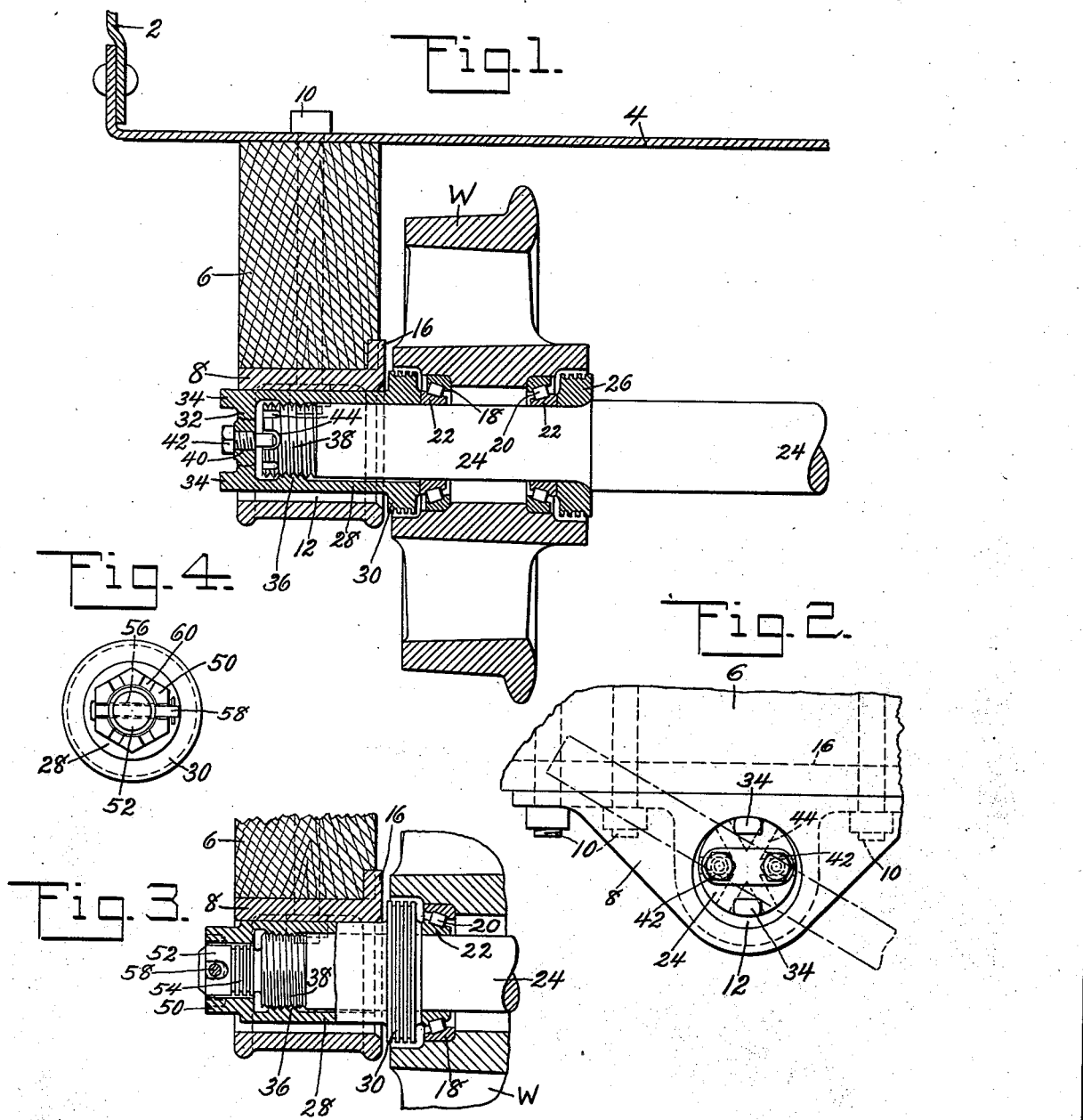
INVENTORS
Ernest R. Schroeder
Victor Willoughby
BY Donald U. Rich ATTORNEY Patented Nov. 4, 1941

2,261,603

UNITED STATES PATENT OFFICE 2,261,603

ADJUSTABLE MINE CAR BEARING

Ernest R. Schroeder, Hawthorne, and Victor Willoughby, Ridgewood, N. J., assignors to American Car and Foundry Company, New York, N. Y., a corporation of New Jersey Application April 9, 1940, Serial No. 328,624

6 Claims. (Cl. 308—180)

This invention relates to mine cars in general and in particular to such cars having antifriction bearings and adjusting means therefor.

In mine cars having the body supported on sills located outside of the running wheels considerable difficulty has been experienced in adjusting the antifriction bearings located in the wheels. With the known arrangements such adjustment is either so difficult or necessitates disassembly of the parts that in most cases the operator will permit the cars to run with bearings out of adjustment, thus causing wheel and axle breakage in addition to the hard running of the cars. It is an object, therefore, of the present invention to provide a new and improved means of adjusting wheel carried antifriction bearings.

A further object of the invention is the provision of an adjusting means for wheel carried bearings, which means is operable from the side of the car and may be adjusted irrespective of whether or not the car is loaded.

A still further object of the invention is the provision of an adjusting means for wheel carried antifriction bearings, which means is so constructed as to prevent any corrosion of the threads.

These and further objects of the invention will be apparent to persons skilled in the art from a study of the following description and accompanying drawing, in which:

Figure 1 is a sectional view through a lower corner of the car and taken substantially in the vertical plane of the axle;

Fig. 2 is an end view of the construction shown in Fig. 1;

Fig. 3 is a partial sectional view similar to Fig. 1 and disclosing a modification thereof; and Fig. 4 is an end view of the construction shown in Fig. 3.

Referring now to the drawing in detail, it will be seen that the car is in general similar to the car shown in Johnson Patent 1,555,982 and is formed with side sheet 2 fastened to floor sheet 4, which is in turn supported upon wooden or other type side sill 6. The side sill is supported at spaced points upon bearing supports or journal boxes 8 preferably of cast metal and secured to the sills by means of bolts or other means 10. Each bearing support or journal box is provided with a vertically elongated opening 12 adapted to receive the ends of the car axle and associated parts and is also formed with an upstanding flange 16 engageable with the sill to relieve the securing means of shear strains. The car is supported upon wheels W with the hubs so formed as to receive outer races 18 of antifriction bearings 20, the inner races 22 of which engage the axle 24. These bearings are shown as of the type manufactured by the Timken Bearing Company of Canton, Ohio and, therefore, need not be further described. In order to prevent entrance of dust into the bearing a standard inner dust collar 26 is provided which is shrunk on the axle and serves also as an abutment to restrict axial movement of the innermost inner race of the bearing. The outermost inner race bears against a combined bearing adjustment sleeve and dust collar 28.

The combined bearing adjustment sleeve and dust collar, as clearly shown in Fig. 1, is cylindrical in form with the enlarged dust collar 30 being formed thereon adjacent one end, while the opposite end is closed by an end wall 32 from which two or more lugs 34 extend in such a way as to receive a bar or other tool as indicated by line and dash outline of Fig. 2. By use of the bar or other tool inserted between the lugs rotation of the cylindrical bearing sleeve and dust collar may be accomplished. In order to cause axial shifting of the cylindrical member it is internally threaded as at 36 adjacent the outer end and these threads are adapted to engage the threads 38 formed on the outer ends of the axle outwardly of the wheels, thus rotation of the cylindrical member will cause it to move axially, thus either tightening or loosening the bearings in the wheels and permitting proper adjustment thereof. The outer wall of the cylindrical member is preferably drilled and tapped at spaced points, such as 40, to receive dog bolts 42, the inner ends of which may extend into radial grooves 44 milled or otherwise formed in the ends of the axle and as clearly indicated in Fig. 2. These dog bolts will, when inserted with the inner end located in an axle groove, prevent any rotation of the cylindrical member relative to the axle. It will be obvious, of course, that in placing the cylindrical member on the axle, grease will be inserted in the member, thereby thoroughly lubricating the threads and that this grease cannot be washed out or the threads corroded since the outer end of the cylindrical member is completely closed by the end wall and dog bolts. As clearly shown in Fig. 1, the combined bearing adjustment sleeve and dust collar closely engages the extended ends of the axle and in turn is engaged within the elongated opening of the bearing support or box and thus supports the car on the extended ends of the axle.

In the slight modification shown in Figs. 3 and 4 the car structure, wheel and bearing assembly is identical with that just described and accordingly the same reference numerals have been applied. Also the cylindrical member or combined bearing adjustment sleeve and dust collar is very similar to that previously described and wherever possible the same reference numerals have been used. In this form, however, the outer end of the cylindrical member is not closed but terminates in a hexagonal end 50 formed with a center bore adapted to receive the reduced diameter extension 52 of the axle. This reduced extension, as clearly shown, is formed with grease sealing grooves 54 and with a transverse hole 56. This hole is adapted to receive a cotter or other locking means 58 extending therethrough and into the appropriate slots 60 formed in the hexagonal end of the cylindrical member. Removal of the cotter or other securing means will, of course, permit rotation of the cylindrical member with consequent axial movement, thus permitting adjustment of the wheel bearings from the side of the car.

While the invention has been described more or less in detail with particular reference to two modifications thereof, it will be obvious to persons skilled in the art that various other modifications and rearrangements of parts may be made and all such modifications and rearrangements of parts are contemplated as will fall within the scope of the appended claims which define our invention.

What is claimed is:

1. In a structure of the character described, the combination with a wheel, antifriction bearings in the wheel protected in part by an inner dust collar, an axle supported by said anti-friction bearings and extending outwardly beyond the wheel, a cylindrical member engageable upon the extended end of said axle and supporting a bearing box, said member having threaded engagement with the end of said axle and bearing against a part of the antifriction bearing in the wheel, said cylindrical member and axle being free to move as a unit in at least three directions at all times relative to the bearing box, and an outer dust collar formed on said member to protect the antifriction bearings.

2. In a structure of the character described, the combination with a wheel, antifriction bearings in the wheel protected in part by an inner dust collar, an axle supported by said antifriction bearings and extending outwardly beyond the wheel, a cylindrical member engageable upon the extended end of said axle and supporting a bearing box for relative vertical and sliding movement, said member having threaded engagement with the end of said axle and bearing against a part of the antifriction bearing in the wheel, and an outer dust collar formed on said member to protect the antifriction bearings, said member being also provided with means whereby said member may be rotated on the axle or locked thereto against rotation.

3. In a structure of the character described, the combination with a wheel, antifriction bearings in the wheel protected in part by an inner dust collar, an axle supported by said anti-friction bearings and extending outwardly beyond the wheel, a cylindrical member engageable upon the extended end of said axle and supporting and freely movable within a bearing box, said member having threaded engagement with the end of said axle and bearing against a part of the antifriction bearing in the wheel, and an outer dust collar formed on said member to protect the antifriction bearings, said member being also formed with a reduced diameter end portion engageable over a reduced axle portion whereby said member may be rotated on the axle to adjust the bearings or locked to the axle to prevent rotation.

4. In a structure of the character described, the combination with a wheel, antifriction bearings in the wheel protected in part by an inner dust collar, an axle supported by said antifriction bearings and extending outwardly beyond the wheel, a cylindrical member engageable upon the extended end of said axle and supporting and freely movable within a bearing box, said member having threaded engagement with the end of said axle and bearing against a part of the antifriction bearing in the wheel, and an outer dust collar formed on said member to protect the antifriction bearings, said member being also provided with spaced lugs whereby said member may be rotated on the axle to adjust the antifriction bearings and with spaced dog bolts engageable with the axle to prevent rotation of the member.

5. In a structure of the character described, the combination with a wheel, antifriction bearings in the wheel protected in part by an inner dust collar, an axle supported by said antifriction bearings and extending outwardly beyond the wheel, a cylindrical cup shaped member having internal threads engaging on the extended end of said axle to cause axial movement of the member during rotation thereof, said member bearing against a part of the antifriction bearing and being formed with a dust collar adjacent the bearing to protect the same, and spaced dog bolts extending through the base of said cup shaped member and into engagement with the ends of said axle to prevent rotation of the member on the axle.

6. As an article of manufacture a combined bearing adjustment sleeve and dust collar for antifriction bearings comprising a substantially cylindrical cup shaped member having a substantially smooth cylindrical exterior adapted to support and be freely movable within a journal box, internal threads formed in said member adjacent the base thereof to engage threads on an axle, and a dust collar forming the rim of the member and cooperating with a wheel hub to prevent entrance of foreign matter into the bearing, said member also including lug means whereby the member may be rotated on the axle and bolt means whereby the member may be locked against rotation on the axle.

ERNEST R. SCHROEDER.
VICTOR WILLOUGHBY.